United States Patent

Gautier et al.

[11] Patent Number: 5,528,975
[45] Date of Patent: Jun. 25, 1996

[54] BOOSTER WITH A POROUS BELLOWS FORMING A FILTER

[75] Inventors: Jean Pierre Gautier; Ulysse Verbo, both of Aulnay-sous-Bois; Miguel Perez Revilla, Argenteuil, all of France

[73] Assignee: AlliedSignalEurope Services Techniques, Drancy, France

[21] Appl. No.: 244,169

[22] PCT Filed: May 6, 1994

[86] PCT No.: PCT/FR94/00534

§ 371 Date: May 20, 1994

§ 102(e) Date: May 20, 1994

[87] PCT Pub. No.: WO94/29151

PCT Pub. Date: Dec. 22, 1994

[30] Foreign Application Priority Data

Jun. 14, 1993 [FR] France .................................. 93 07120

[51] Int. Cl.⁶ ............................................... F15B 9/10
[52] U.S. Cl. ............................................... 91/376 R; 92/96
[58] Field of Search ............................... 91/369.1, 369.2, 91/376 R; 92/96, 98 R

[56] References Cited

U.S. PATENT DOCUMENTS

| 2,800,770 | 7/1957 | Edge et al. | 91/369.1 X |
| 4,716,814 | 1/1988 | Yamakoshi | 91/376 R |
| 4,718,324 | 1/1988 | Gautier et al. | 91/376 R X |
| 5,161,454 | 11/1992 | Frasier | 91/376 R |

FOREIGN PATENT DOCUMENTS

| 3924672 | 1/1991 | Germany . |
| 9015412 | 4/1992 | Germany . |
| 2138521 | 10/1984 | United Kingdom . |

*Primary Examiner*—Hoang Nguyen
*Attorney, Agent, or Firm*—Leo H. McCormick, Jr.

[57] ABSTRACT

A pneumatic brake booster having a piston which slides in a casing with a portion that extends outside of the casing. A tubular protective bellows has a first end connected to the casing and a second end that engages an input rod through which an operational signal is communicated to a valve retained the valve. The bellows is made of a porous and deformable material such that air communicated to the valve in response an input force applied to the control rod is directly passes through the porous bellows. The porous bellows has a pore size such that any contamination in the air is removed or filtered before being presented to the valve.

5 Claims, 2 Drawing Sheets

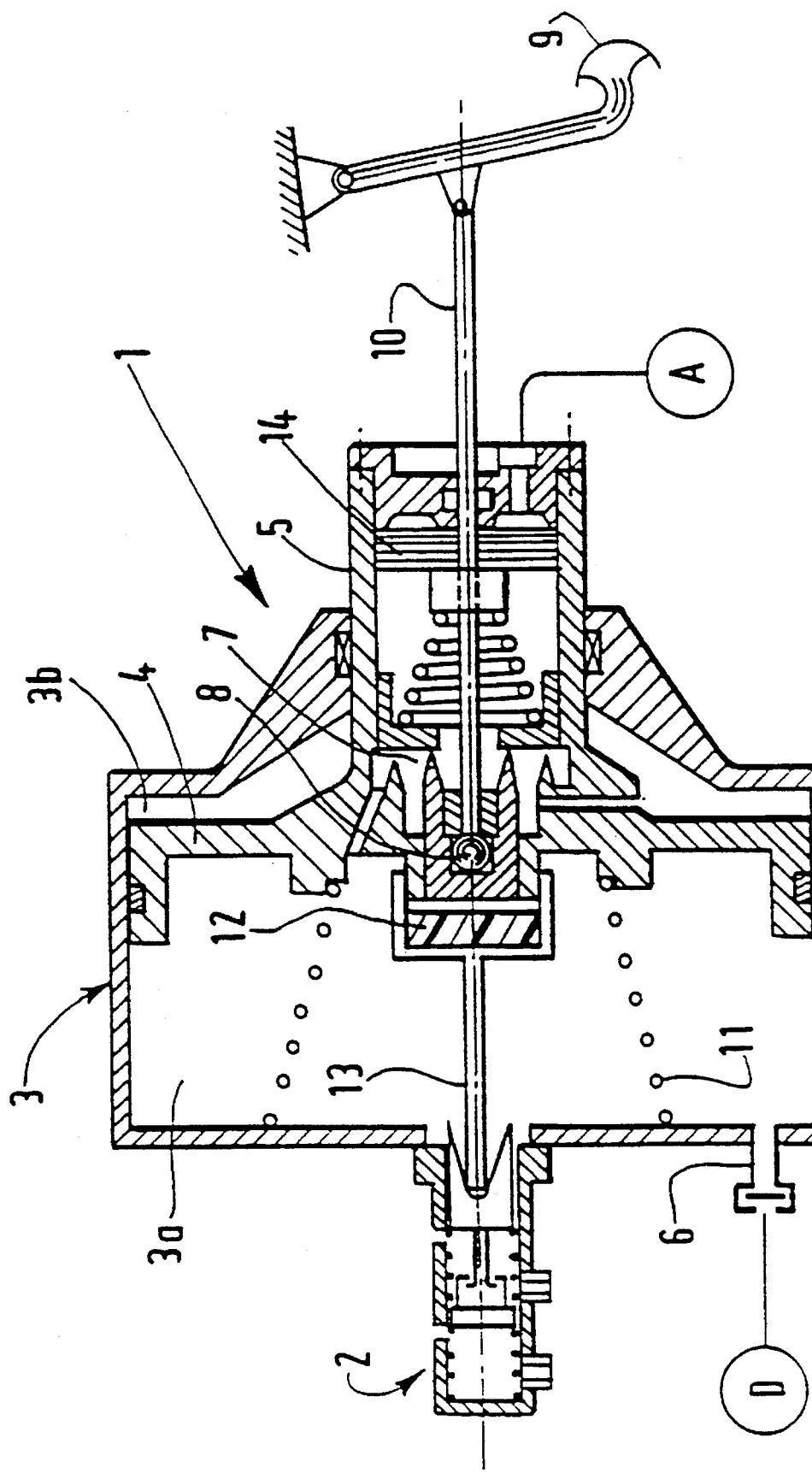

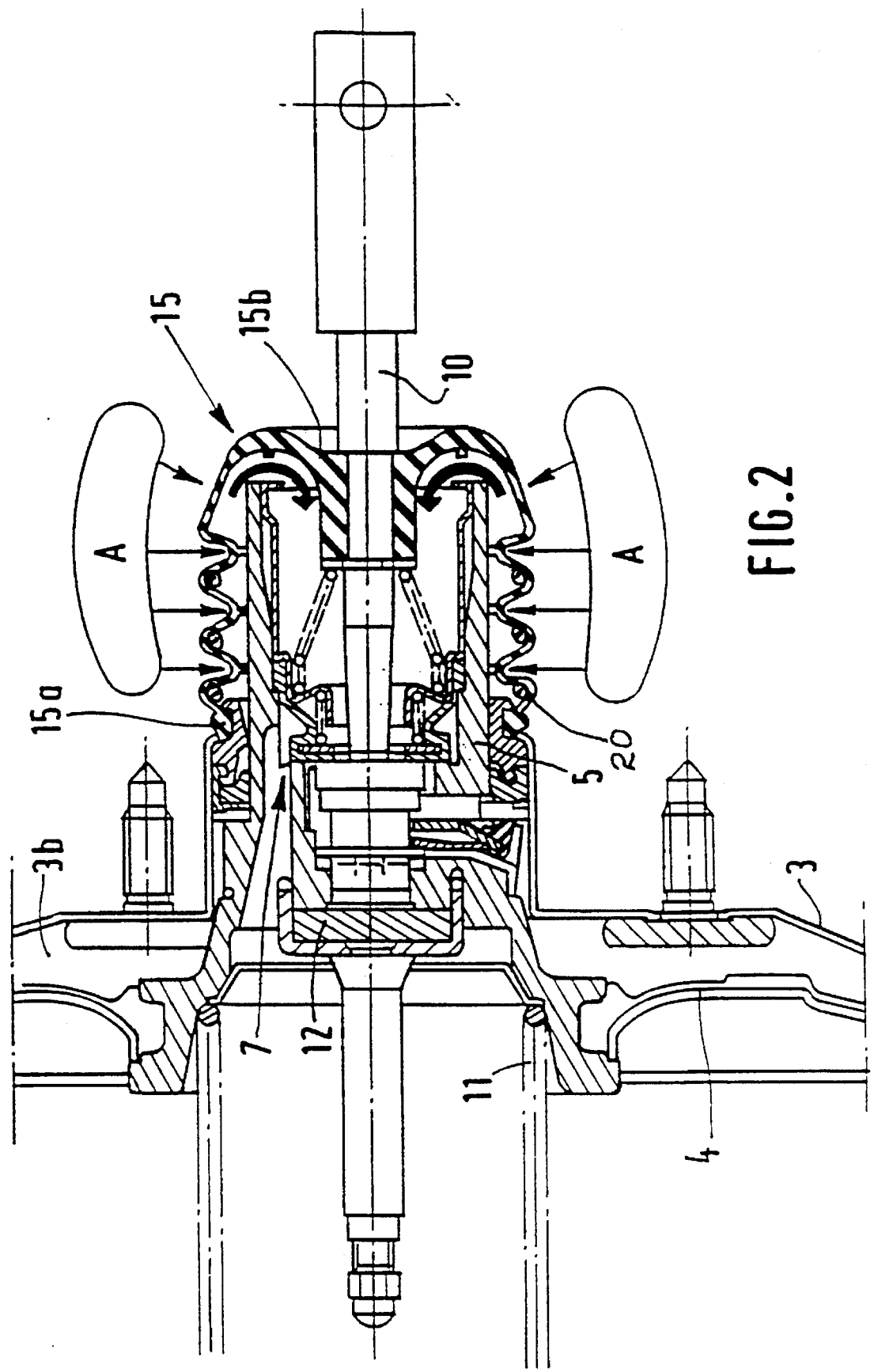

BOOSTER WITH A POROUS BELLOWS FORMING A FILTER

The present invention relates to a pneumatic brake booster using first and second sources of pressure delivering first and second respective and different pressures. The booster comprising a rigid casing separated by at least one sealed movable partition into at least two chambers the first of which is connected to the first source and the second of which is capable of being connected selectively by means of a valve to either one of the two sources. The movable partition is capable of being forced by the difference in the pressures prevailing in the chambers to move an essentially cylindrical pneumatic piston sliding in a sealed fashion in the casing. The piston has a cylindrical projection which is housed outside the casing in a tubular protective bellows. One first end of the bellows is connected to the casing and the other end is connected to a control rod.

Devices of this type, which are well known in the prior art, are used today on a great number of motor vehicles.

Despite the conventional nature of the techniques in question, boosters continue to form the subject of significant research aiming in particular to reduce the cost, response time to a stimulation, and operational noise level thereof.

The invention as disclosed in this application contributes to the reduction of at least one of these three parameters.

To this end, the booster of the invention is essentially characterized in that the bellows protecting the piston is at least partially produced from a porous and deformable material which constitutes a purifying filter to remove any contamination in the air prior to being presented to the valve.

By virtue of this arrangement, a conventional filter may in effect be eliminated, which leads to a reduction in cost.

Moreover, the surface area of the bellows which is in contact with the second pressure source (generally the atmosphere) is easily much greater, due to its shape and arrangement, than the surface area offered by a conventional filter, such that in the communication of the second chamber is much faster and quieter as noise is substantially reduced.

According to a preferred embodiment, the bellows is at least partially produced of a porous elastomeric material and its second end surrounds the control rod which serves to control the operation of the valve.

Other features and advantages of the invention will emerge clearly from the detailed description thereof given hereafter:

BRIEF DESCRIPTION OF THE DRAWINGS

FIG. 1 is a diagrammatic sectional view of a pneumatically boosted braking system using a conventional booster; and FIG. 2 is a view in partial section of a booster in accordance with the invention.

DETAILED DESCRIPTION OF THE INVENTION

Insofar as the invention relates only to an improvement made to pneumatically boosted braking systems, and the general constitution and operation of the latter are well known to the person skilled in the art, these systems will be recalled briefly here solely to allow a complete understanding of the improvement which the invention represents.

The pneumatically boosted brake system illustrated in FIG. 1 comprises a booster 1 and a master cylinder 2.

The booster includes a rigid casing 3 which is separated into front and rear chambers 3a and 3b in a sealed fashion by a movable partition 4. The movable partition forms a pneumatic piston 5 which can move inside the casing 3.

The front chamber 3a, the front face of which is closed in a sealed fashion by the master cylinder 2, is permanently connected to a source of low pressure D via a non-return valve 6.

The back chamber 3b is, in contrast, capable of selectively being connected either to the source of low pressure D, or to a source of high pressure, for example the atmosphere A.

Communication or access to the back or rear chamber 3b is controlled by movement of a valve 7 and a plunger 8. The plunger 8 is connected to a brake pedal 9 by means of a control rod 10.

When the control rod 10 is in the rest position, in this case pulled to the right, the valve 7 normally establishes a communication between the front and rear chambers 3a and 3b of the booster.

Since the back or rear chamber 3b is then subjected to the same depression as the front chamber 3a the piston 5 is pushed back or moved towards the right to a rest position, by a return spring 11.

Actuation of valve 7 is achieved by movement of plunger 8 in response to an input force applied to by means control rod 10 towards the left. Initial movement of plunger 8 allows valve 7 to isolate the front chamber 3a from the rear chamber 3b and further movement of valve 7 allows air at atmospheric pressure to be communicated to the back or rear chamber 3b.

The difference in pressure between the front and rear chambers, acts on the movable partition 4 to develop a force the latter a thrust which tends to move it towards the left and allow it to entrain the piston which in turn moves, compressing the spring 11.

The braking force exerted on the plunger 8 by the control rod 10, or "input force" and the force for boosting the braking, or "boost force", resulting from the thrust of the movable partition 4 act jointly on a reaction disk 12 in order to constitute an actuating force which is transmitted to the master cylinder 2 by means of a push rod 13.

As shown in FIG. 1, the pneumatic piston 5 conventionally retains a purifying filter 14 to prevent communication any pollution in the atmosphere A to valve 7 and the rear or back chamber 3b.

Moreover, and although not visible in the skeleton diagram of FIG. 1, a tubular protective bellows, connected to the casing by a first one of its two ends, totally surrounds the part of the piston 5 which is located outside the casing 3.

According to the invention, illustrated in FIG. 2, this bellows 15 is at least partially produced from a porous and deformable material. The material has a pore size such that air can freely flow to valve 7 and yet any contamination present in the atmospheric air is retained or filtered before being presented to valve 7.

In reality, bellows 15 may be composite or homogeneous.

In the first case or embodiment illustrated in FIG. 2, bellows 15 is produced by a sheath of any fibrous or woven material which is supported by a coil spring 20. The bellows 15 is fastened to a casing 3 by its first end, and closing onto the control rod 10 at its second end.

In the second modification of the embodiment illustrated in FIG. 2, the bellows 15 assumes the shape of a tube without a coil support. The tube is at least partially produced from a porous elastomeric material having a pore sizes which allow air to freely pass while retaining contamination which may be present in the air. The first end 15a of is fastens onto the casing 3 and the second end 15b engages around the control rod 10.

We claim:

1. A pneumatic brake booster using first and second sources of fluid having first and second different pressures, said booster having a rigid casing with an interior separated into at least front and rear chambers by a sealed movable partition, said first chamber being connected to said first source of fluid and said second chamber being connected selectively by means of a valve responding to an operational input signal to either one of said first and second sources of fluid, said movable partition being capable of being forced by a difference in the pressures prevailing in said first and second chambers to move an essentially cylindrical pneumatic piston sliding in a sealed fashion in said casing and carrying said valve, said piston having a portion thereof which extend outside said casing, a tubular protective bellows surrounding said portion of said piston outside said casing, said bellows is characterized by being at least partially a porous and deformable material through which said second source of fluid is directly communicated to said valve to develop said difference in pressure, said porous material forming a purifying filter to remove contamination that may be present in said second source of fluid.

2. The pneumatic booster according to claim 1 wherein said input signal is communicated to said valve by a control rod and said bellows has a first end connected to said housing and a second end that engages said control rod.

3. The pneumatic booster according to claim 2 wherein said porous material is elastomeric material.

4. The pneumatic booster according to claim 2 wherein said bellows further includes a spring to support said porous material.

5. The pneumatic booster according to claim 1 wherein said bellows has a first end separated from a second end by a tubular section, said first end being secured to said casing and said second end being secured to a control rod connected to said valve, said tubular section being made of an elastomeric material and said second source of fluid is communicated primarily through said tubular section to said valve.

* * * * *